(12) United States Patent
Zhou et al.

(10) Patent No.: US 7,869,465 B2
(45) Date of Patent: Jan. 11, 2011

(54) HYBRID CROSS-LINK

(75) Inventors: Xinkuan Zhou, Eden Prairie, MN (US);
Clifton Powers, Raleigh, NC (US);
Laxman Anne, Eden Prairie, MN (US);
Manish Sharma, Eden Prairie, MN (US); Joe Polland, Eden Prairie, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 121 days.

(21) Appl. No.: 12/172,436

(22) Filed: Jul. 14, 2008

(65) Prior Publication Data

US 2009/0092150 A1    Apr. 9, 2009

Related U.S. Application Data

(60) Provisional application No. 60/978,358, filed on Oct. 8, 2007.

(51) Int. Cl.
*H04J 3/00* (2006.01)
(52) U.S. Cl. ...................................... 370/498
(58) Field of Classification Search .................. 370/498
See application file for complete search history.

(56) References Cited

U.S. PATENT DOCUMENTS

| | | | |
|---|---|---|---|
| 5,187,803 | A | 2/1993 | Sohner et al. |
| 6,373,860 | B1 | 4/2002 | O'Toole et al. |
| 6,741,701 | B1 * | 5/2004 | Barak et al. ............ 379/406.01 |
| 2002/0159507 | A1 | 10/2002 | Flaig et al. |
| 2003/0012184 | A1 * | 1/2003 | Walker et al. ............... 370/352 |
| 2003/0093703 | A1 | 5/2003 | Oliver et al. |
| 2004/0170438 | A1 | 9/2004 | Kuribayashi |
| 2006/0233188 | A1 | 10/2006 | Oliver et al. |
| 2008/0019501 | A1 * | 1/2008 | Miller et al. ................ 379/412 |

FOREIGN PATENT DOCUMENTS

JP          07095228         4/1995
KR       101999057995        7/1999

OTHER PUBLICATIONS

Rup et al., "SHDSL Technology Complementing Other Transport Technologies", EUROCON 2003,Computer as a Tool. The IEEE Region 8 , vol. 1, No. pp. 229-232 vol. 1, Sep. 22-24, 2003.*
International Searching Authority, "International Search Report", Feb. 6, 2009, Publisher in: WO.

* cited by examiner

*Primary Examiner*—Albert T Chou
(74) *Attorney, Agent, or Firm*—Fogg & Powers LLC

(57) ABSTRACT

A communication system comprises a first communication unit having a plurality of application ports; and a second communication unit having a plurality of application ports and coupled to the first communication unit; wherein the first communication unit is configured to extract timeslots from a first signal having a first interface format and from a second signal having a second interface format, and to insert the extracted timeslots into a frame for transmission to the second communication unit; wherein the second communication unit is configured to pass the first interface format signal to an application port of a similar interface format and to pass the second interface format signal to an application port of a third dissimilar interface format based on the order of the extracted timeslots in the frame transmitted from the first communication unit.

20 Claims, 8 Drawing Sheets

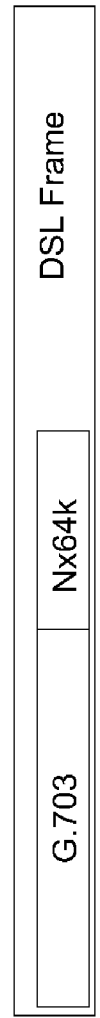
Figure 2A
Figure 2B

| G.SHDSL X-Connect Summary | |
|---|---|
| STU-C | STU-R |
| G.703 Nx64k | G.703 Ethernet |
| G.703 Ethernet | G.703 Nx64k |
| Ethernet Nx64 | Ethernet G.703 |
| Ethernet G.703 | Ethernet Nx64 |

Figure 3

HYBRID CROSS-LINK

CROSS-REFERENCE TO RELATED APPLICATIONS

This application is related to the following co-pending United States patent applications, all of which are hereby incorporated herein by reference:

U.S. provisional patent application Ser. No. 60/978,358, filed Oct. 8, 2007 (entitled "Hybrid Application") which is referred to herein as the "'883 application". The present application hereby claims priority, under 35 U.S.C. §119(e), to U.S. Provisional Patent Application No. 60/978,358;

U.S. patent application Ser. No. 12/036,644, filed on Feb. 25, 2008 (entitled "POINT TO MULTIPOINT CROSSLINK") and which is referred to herein as the '822 application;

U.S. patent application Ser. No. 12/036,663, filed on Feb. 25, 2008 (entitled "MEDIA CONVERTER") and which is referred to herein as the '823 application; and U.S. patent application Ser. No. 12/036,678, filed on Feb. 25, 2008 (entitled "CROSS-LINK") and which is referred to herein as the '824 application;

BACKGROUND

A typical digital subscriber line (DSL) communication network consists of a local unit and remote units, connected together by DSL. Each of the local and remote units can be equipped with various application interfaces such as G.703, Ethernet, and Nx64k. The application interface formats are transported between units over DSL pairs, such as over G.SHDSL (G.991.2) interfaces. In this manner a user is able to connect interfaces of the same type on different units. For example, a G.703 interface on a local unit may be connected to a G.703 interface on a remote unit.

SUMMARY

The above mentioned problems and other problems are resolved by the present invention and will be understood by reading and studying the following specification.

In one embodiment, a communication system is provided. The communication system comprises a first communication unit having a plurality of application ports; and a second communication unit having a plurality of application ports and coupled to the first communication unit; wherein the first communication unit is configured to extract timeslots from a first signal having a first interface format and from a second signal having a second interface format, and to insert the extracted timeslots into a frame for transmission to the second communication unit; wherein the second communication unit is configured to pass the first interface format signal to an application port of a similar interface format and to pass the second interface format signal to an application port of a third dissimilar interface format based on the order of the extracted timeslots in the frame transmitted from the first communication unit.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which:

FIGS. 2A and 2B are block diagrams of frames transmitted in a communication system according to one embodiment of the present invention.

FIG. 3 a table of hybrid cross connections according to one embodiment of the present invention.

Figure 4:
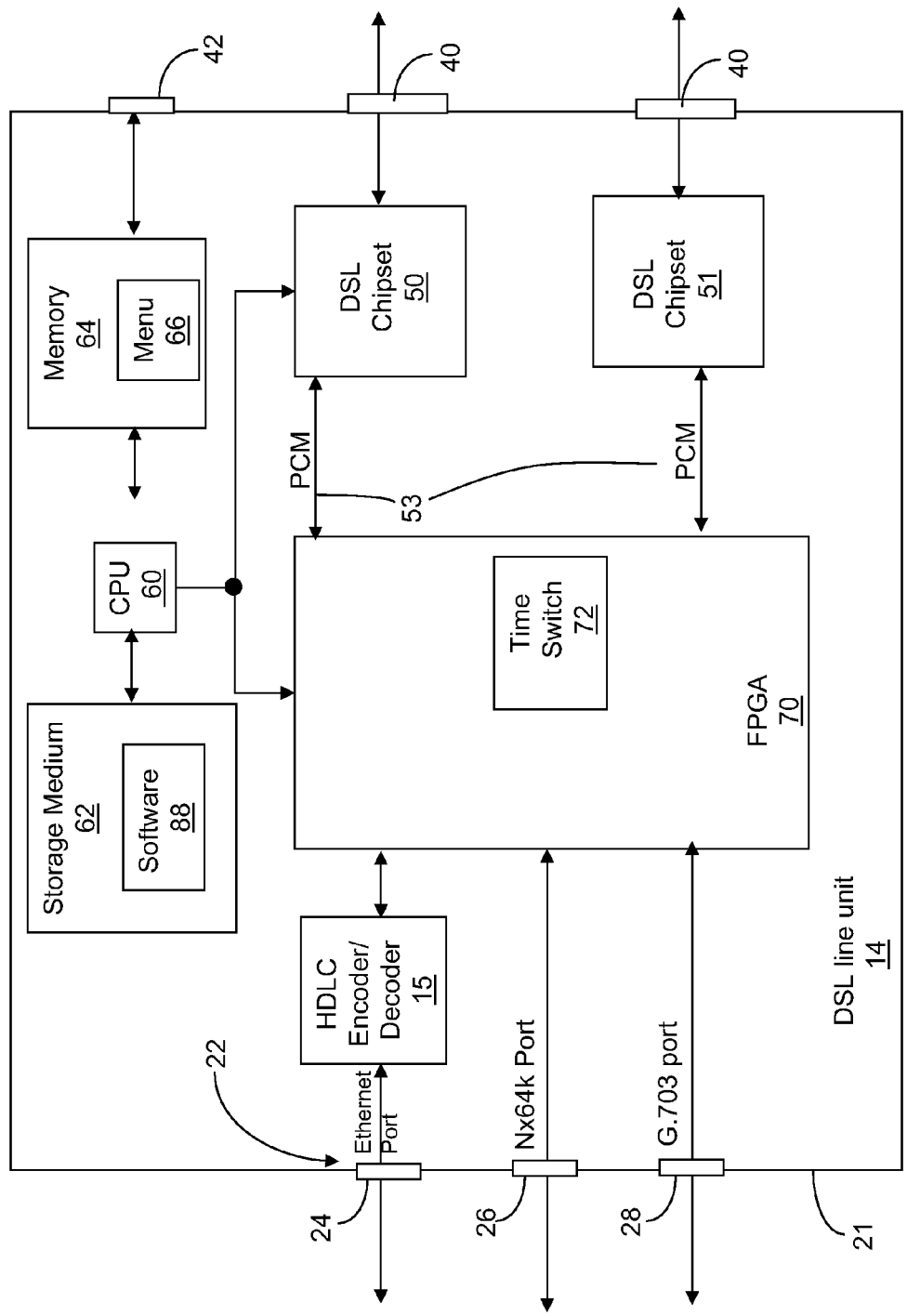

FIG. 4 is a block diagram of a DSL unit according to one embodiment of the present invention.

Figure 5:
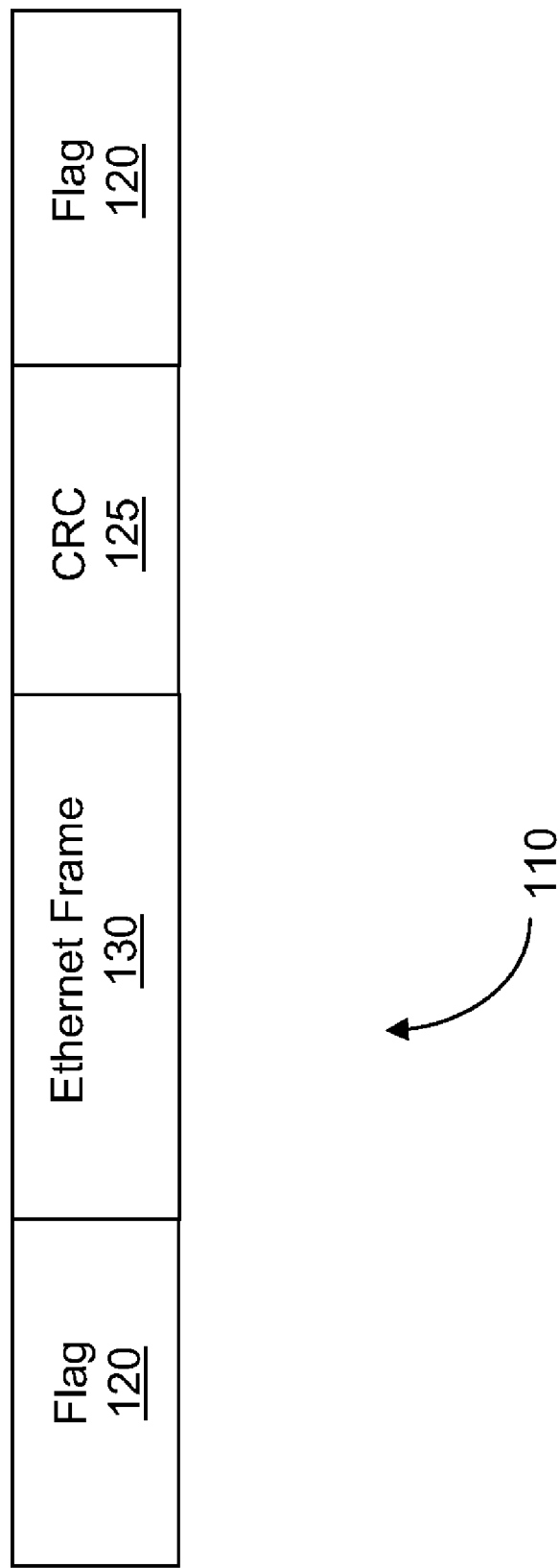

FIG. 5 shows one embodiment of the data structure of the high-level data link control encoding.

Figure 6:
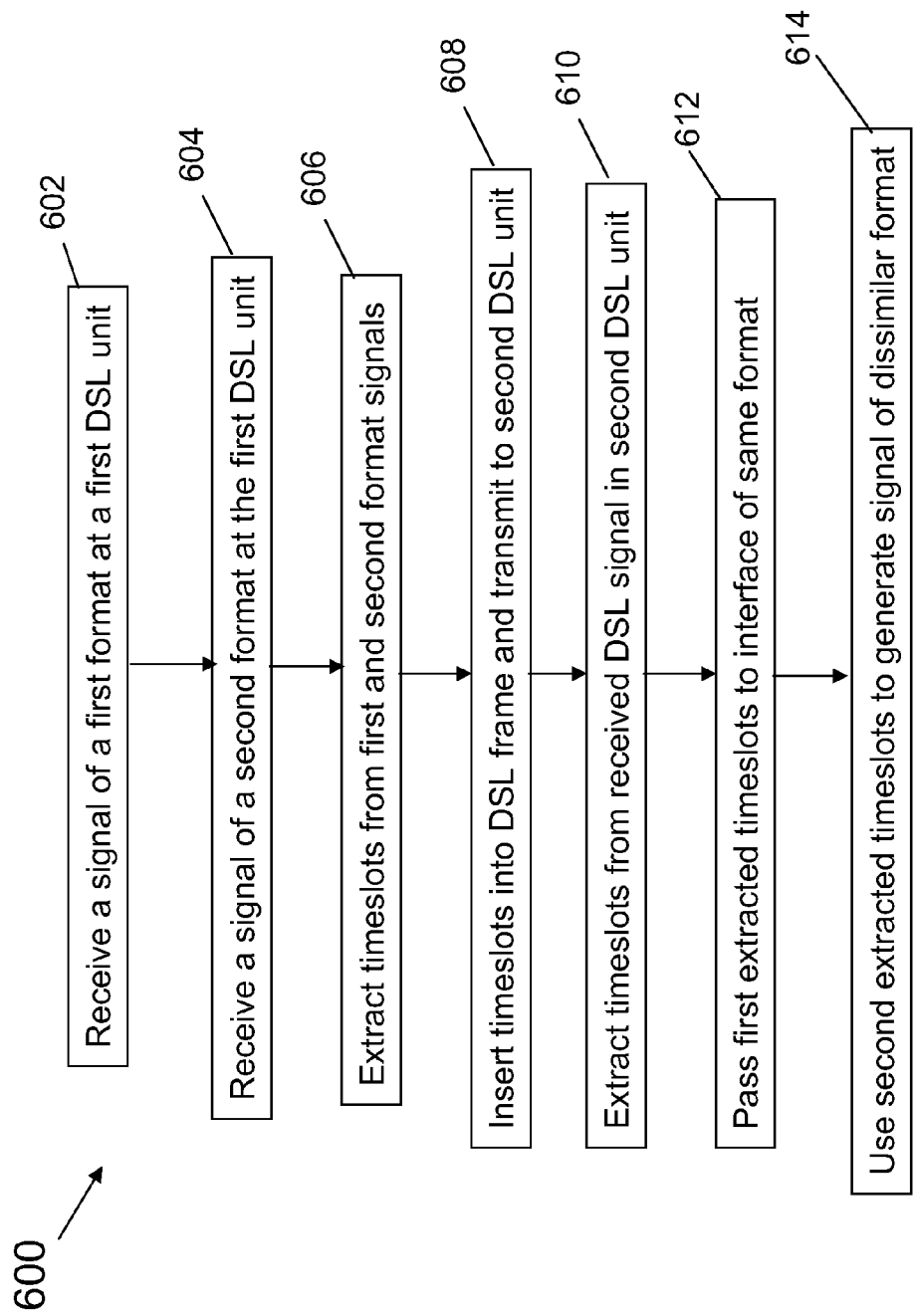

FIG. 6 is a flow chart depicting a method of communication in a network according to one embodiment of the present invention.

Figure 7:
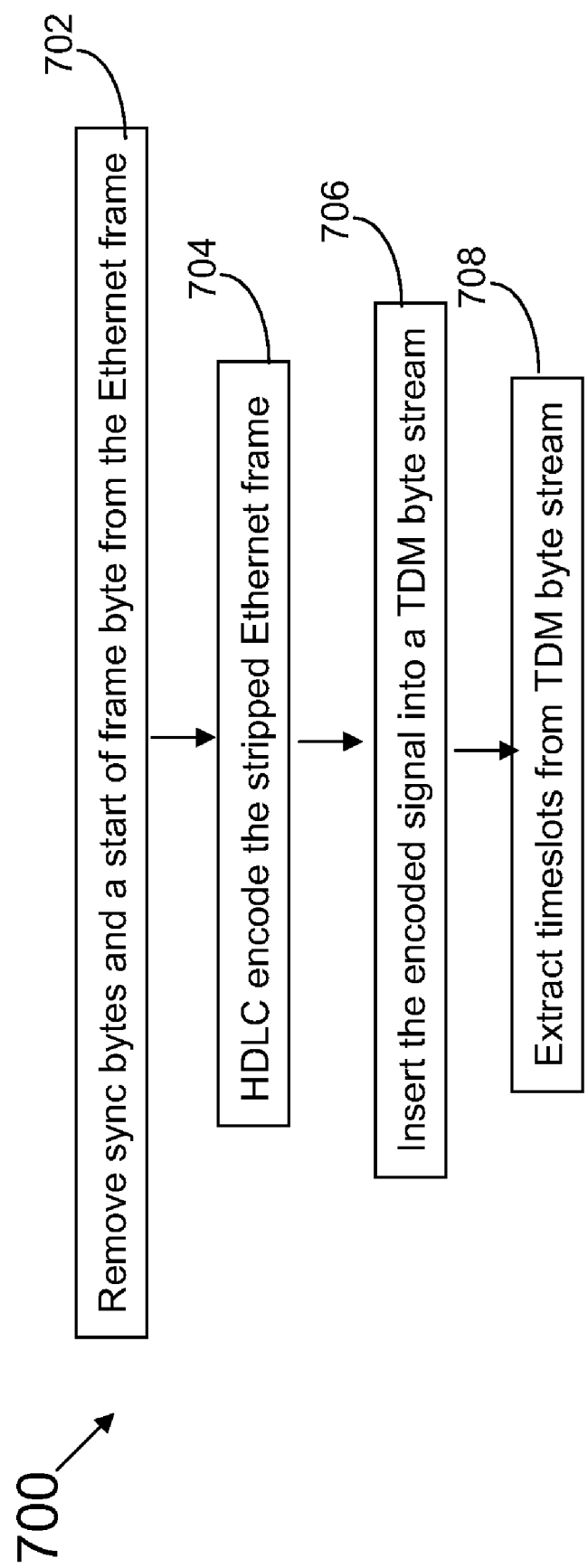
Figure 8:
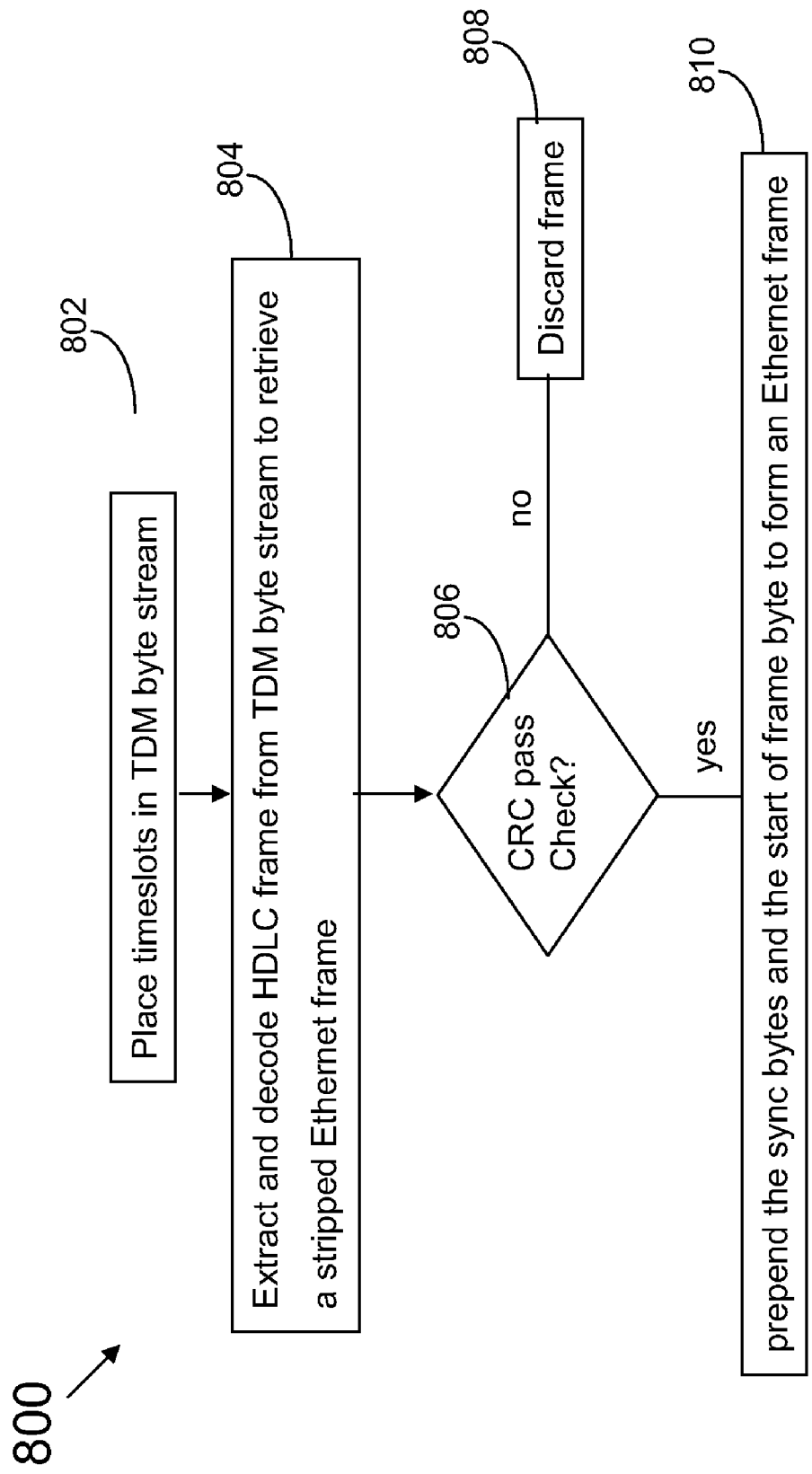

FIG. 7 is a flow chart depicting a method of extracting timeslots from an Ethernet signal in a DSL unit according to one embodiment of the present invention FIG. 8 is a flow chart depicting a method of generating an Ethernet signal from received timeslots in a DSL unit according to one embodiment of the present invention.

In accordance with common practice, the various described features are not drawn to scale but are drawn to emphasize specific features relevant to the present invention. Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

Embodiments of the present invention enable more flexibility in a communication network by allowing a user to connect different interface types to each other as well as connect similar interface types to each other at the same time. For example, a local G.703 interface can be connected to a remote G.703 interface while a local Ethernet interface is coupled to a remote Nx64k interface. Hence, more flexibility is enabled in embodiments of the present invention than in a typical communication network.

Figure 1:
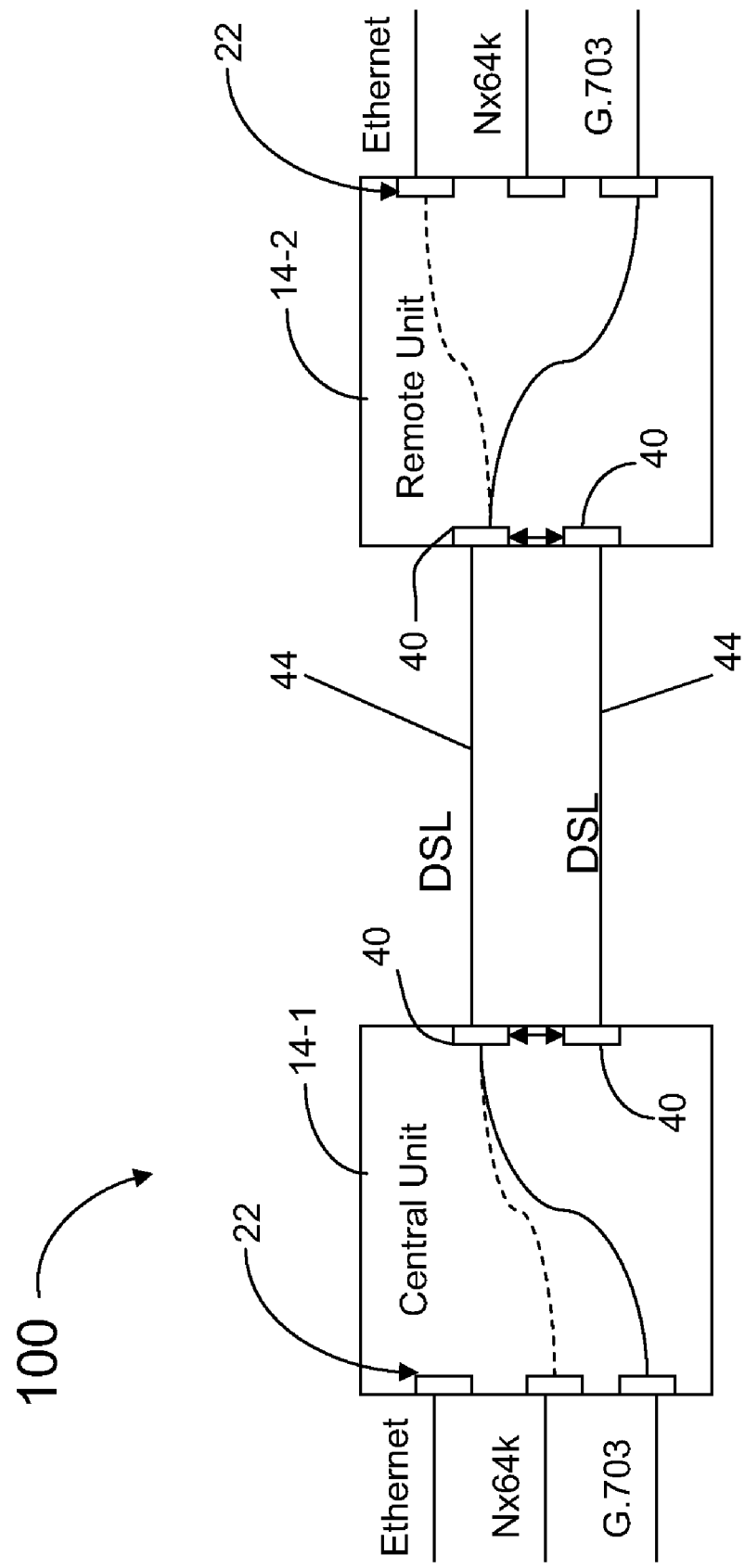
FIG. 1 is a block diagram of a communication system according to one embodiment of the present invention.

FIG. 1 is a block diagram of a communication system 100 according to one embodiment of the present invention. Network 100 includes two DSL units 14-1 and 14-2. Notably, although embodiments of the present invention are described herein with respect to a DSL communication network, it is to be understood that other network technologies can be used in other embodiments, such as cable networks. DSL units 14-1 and 14-2 are communicatively coupled together via two DSL pairs 44 connected to a respective communication line port 40 in each of DSL units 14-1 and 14-2. Communication line port 40 is also referred to as a DSL port 40 since the exemplary embodiments described herein are described with respect to a DSL unit. As indicated by the arrows between the two DSL ports 40 in each DSL unit, network 100 is operating in M-pair mode, where M represents the number of DSL pairs. In M-pair mode, DSL pairs 44 effectively create an aggregate bandwidth. For example, in some embodiments each DSL pair has a bandwidth of 2.3 Mbits creating an aggregate bandwidth of 4.6 Mbits in embodiments with two DSL pairs. In other embodiments, each DSL pair is configured with a bandwidth of 5.696 Mbits creating an aggregate bandwidth of 11.392 Mbits. However, network 100 can operate in other modes, in other embodiments, such as single-pair mode or protection mode.

In this embodiment, each of DSL units 14-1 and 14-2 are configured according to the Global.standard High-Bit-Rate Digital Subscriber Line (G.SHDSL) standard. For example, an exemplary DSL unit according to embodiments of the present invention is the WorldDSL™ G.SHDSL modem manufactured by ADC, Inc. In addition, in this embodiment, DSL unit 14-1 is configured as a central unit (also known as an STU-C or ATU-C) while DSL unit 14-2 is configured as a remote unit (also known as an STU-R or ATU-R).

Each of DSL units 14-1 and 14-2 has three application ports 22 in the example in FIG. 1. Each application port is configured for a different interface format. For example, in this embodiment the three interface formats used are G.703, Nx64k, and Ethernet. However, other interface formats can be used in other embodiments. The interface format G.703 is an International Telecommunication Union Telecommunication (ITU-T) standard for transmitting voice or data over digital carriers such as TI and E1. G.703 provides the specifications for pulse code modulation. In one implementation of this embodiment, G.703 is sent over balanced 120 ohm twisted pair cables terminated in RJ-45 jacks. In addition, G.703 can operate in one of two modes: structured and unstructured. The structured mode is a frame format having a specified length for the timeslots. The unstructured mode is a continuous bit stream of 2 Mbytes per second.

The Nx64k interface format is a timeslot based format, which is configured with rates up to 178 timeslots. Nx64k is a generic term and an application port for Nx64k format can be configured according to V.35, V.36, X.21, or RS-530 standards. The Ethernet format used in this embodiment is 10/100 Base T Ethernet format. Additionally, the Ethernet application port is either full or half duplex and is configured using auto negotiation and auto-medium-dependent-interface (MDI)/MDI-x. In one implementation of this embodiment, the Ethernet application port is manually configured.

In conventional networks, an application port in a central unit is communicatively coupled only to a similar application port using the same interface format in a remote unit. However, DSL units 14-1 and 14-2 are configured to simultaneously support cross-link connections and conventional connections. A cross-link connection is a connection between dissimilar application ports. For example, the connection between an Ethernet application port in DSL unit 14-1 to an Nx64k application port in DSL unit 14-2 is a cross-link connection. As shown in FIG. 1, a G.703 application port in DSL unit 14-1 is connected to a G.703 application port in DSL unit 14-2 at the same time as the cross-link. The connection of an application port to a similar application port in another DSL unit is referred to herein as a simple connection. Hence, a hybrid connection, as used herein, is a simultaneous simple and cross-link connection.

Exemplary, hybrid connections are shown in the table in FIG. 3. In particular, FIG. 3 shows four exemplary hybrid connections. The first two exemplary connections are comprised of a simple G.703 connection with an Ethernet/Nx64k cross-link connection. The first two exemplary cross-link connections differ in which application port in the central unit and the remote unit are used in the cross-link connection. Similarly, the second two exemplary connections are comprised of a simple Ethernet connection with a G.703/Nx64k cross-link connection. The second two exemplary connections also differ in which application port is used in the central unit and the remote unit for the cross-link connection. By simultaneously enabling both simple and cross-link connections, embodiments of the present invention provide increased flexibility over conventional networks.

In enabling a hybrid connection, DSL units 14-1 and 14-2 are configured to allocate a first subset of timeslots in a DSL frame to a simple connection and subsequent subsets of timeslots in the DSL frame to cross-link connections. For example, FIG. 2A shows an exemplary DSL frame from a central DSL unit 14-1 to remote DSL unit 14-2. As can be seen, a first subset of timeslots 202 is allocated to the G.703 interface format and a second subset of timeslots 204 is allocated to the Ethernet interface format. In the DSL frame from remote unit 14-2 to central unit 14-1, shown in FIG. 2B, the first subset of timeslots 202 is allocated again to the G.703 interface format while the second subset of timeslots 204 is allocated to the Nx64k interface format.

Hence, when DSL units 14-1 and 14-2 receive a DSL frame, the first subset of timeslots is passed to an application port of the same interface format, whereas the second subset of timeslots are passed to an application port of a different interface format. In some embodiments, the size of the subsets of timeslots are determined a priori. In addition, in some embodiments, the cross-link connections are determined a priori. In other words, each DSL unit is configured a priori to pass the data in the second subset of timeslots to a predetermined application port. For example, DSL unit 14-2 is configured to pass the second subset of timeslots to the Nx64k application port. In order to enable the cross-link, DSL 14-1 is configured to place Ethernet interface format data in the second subset of timeslots sent to DSL 14-1. Although, the first subset of timeslots is reserved for simple connections in this embodiment, it is to be understood that, in other embodiments, assignments based on other ordering schemes are used. For example, in one embodiments, the first subset of timeslots is reserved for a cross-link connection and the second subset is reserved for a simple connection.

With respect to cross-link connection, in converting an Ethernet signal to a signal of a different interface format, such as Nx64k or G.703, DSL units 14-1 and 14-2 strip the Ethernet signal of the sync bytes and the start of frame byte. The stripped Ethernet frame is high-level data link control (HDLC) encoded. HDLC encoding involves appending a two byte cyclic redundancy check (CRC) using the polynomial $X16+X12+X5+1$. The Ethernet frame plus CRC is then examined for a continuous bit sequence of five 1's (that is, 11111). A zero is inserted at the end of each sequence of five 1's (that is, 111110). HDLC flags with the pattern "01111110" are also inserted at the beginning and end of the frame. Zero insertion after a sequence of five 1s in the payload is used to avoid confusion of payload with HDLC flags. The HDLC flags are used to identify the start and end of a frame. The HDLC encoded Ethernet frame is then inserted into timeslots to convert to Nx64 or G.703 interface formats. In the reverse direction, the HDLC flags are removed from the start and end of the frame. Similarly, the inserted "0" in the sequence "111110" is removed as well as the appended two byte CRC. The remaining Ethernet frame is then formatted with start of frame and sync bytes in an application port 22 configured for Ethernet signals and transmitted.

In converting a structured G.703 signal to a different interface format, DSL units 14-1 and 14-2 remove the timeslot 0 in a structured G.703 frame. The timeslot is regenerated in the reverse direction when transmitting a G.703 frame over a corresponding application port 22. Also, in some embodiments, DSL units 14-1 and 14-2 disable timeslot 16 of a structured G.703 in order to use the timeslot for payload rather than being used for signaling as in a typical G.703 frame.

After making the applicable adjustments discussed above, DSL units 14-1 and 14-2 convert data from one interface format to another through timeslot range mapping. Timeslot range mapping maps a timeslot of one interface format to a corresponding timeslot or to a byte stream in a second interface format. In addition, fractional timeslot mapping is used in some embodiments. For example, if G.703 timeslots 1-10 are to be mapped with an Nx64k data stream, the data rate of the Nx64k data stream is configured to run at the same rate as the G.703 timeslots. In this example, the data rate is configured to run at 2 Mbs. The timeslots are then inserted into the unframed Nx64k data stream. In order to retrieve the inserted timeslots, the framing byte (i.e. timeslot 0) is generated and inserted into the Nx64k data stream with the inserted timeslots 1-10, as discussed above. When converting from an Nx64k data stream to G.703 timeslots, the Nx64k data rate is configured to match the data rate of the G.703 signal. Blocks of data matching the timeslots to be mapped are then picked and inserted into the G.703 signal. Similarly, in converting to and from and unstructured G.703 signal, the bandwidth of the interface format to which the G.703 signal is mapped is configured with a set bandwidth to match the bandwidth of the unstructured G.703 signal. If G.703 timeslot 16 is disabled in structured mode as described above, then G.703 timeslots 1-31 may be connected to timeslots 1-31 of the destination format. If G.703 timeslot 16 is enabled, G.703 timeslots 1-15 may be connected to timeslots 1-15 of the destination format, and G.703 timeslots 17-31 to timeslots 16-30.

In operation, DSL unit 14-1 receives a signal over a first application port 22 having a first interface format (for example, G.703) and a second signal over a second application port 22 having a second interface format (for example, Ethernet). DSL unit 14-1 extracts timeslots and terminates each signal as described above. The extracted timeslots are then transported as payload over DSL pairs 44 to DSL unit 14-2. In particular, the extracted timeslots corresponding to a desired simple connection are placed first in the payload. In this example, the G.703 timeslots are placed first.

DSL unit 14-2 receives the DSL frame payload and extracts the timeslots. The first extracted timeslots are passed to same interface format as the original interface format (i.e. the G.703 interface format in this example). The second extracted timeslots are then passed to the pre-determined application port 22 configured for a second interface format (for example, Nx64k in this example). The second extracted timeslots are used to create a new signal of the second interface format. The new signal originates at and is transmitted from the corresponding application port 22.

In the reverse direction, a similar process occurs. In particular, DSL unit 14-2 receives a signal in the second interface format (for example, Nx64k) and the first interface format (for example, G.703) over the corresponding application port 22. DSL unit 14-2 extracts timeslots and terminates each signal in the corresponding interface format application port. DSL unit 14-2 then transports the extracted timeslots as payload over DSL pairs 44 to DSL unit 14-1. In particular, the extracted timeslots corresponding to the desired simple connection (G.703 in this example) are placed first in the payload. DSL unit 14-2 then places extracted Nx64k timeslots in the second subset of timeslots. When DSL unit 14-1 receives the DSL payload, it passes the first subset of timeslots to the port of the original interface format (G.703 in this example) and passes the second subset to the Ethernet port. In this way, both a cross-link (Ethernet to Nx64k in this example) and a simple (G.703 in this example) connection are provided simultaneously based on the order the extracted timeslots are placed in the DSL payload transmitted between DSL units 14-1 and 14-2.

FIG. 4 is a block diagram of a DSL unit 14 according to one embodiment of the present invention. DSL unit 14 is used in a communication network such as network 100. DSL unit 14 includes a plurality of different types of application ports represented generally by the numeral 22. Specifically, there are three application ports 22, in this example, on the user interface side 21 and two DSL ports 40 each coupled to a DSL pair as in FIG. 1. Each application port is configured for a different interface format. In particular, application port 24 is configured for an Ethernet format, application port 26 is configured for an Nx64k format, and application port 28 is configured for a G.703 format.

The input from the DSL ports 40 is sent to a respective DSL chipset 50 or 51. In this embodiment, DSL ports 40 are configured for G.SHDSL and chipsets 50 and 51 are G.SHDSL chipsets. Each of DSL chipsets 50 and 51 is coupled to a custom field programmable gate array (FPGA) 70 via a respective pulse code modulation (PCM) interface 53.

The plurality of application ports 22 and the DSL ports 40 are connected via the DSL chipset 50 and the FPGA 70. Notably, although an FPGA is used in this example, embodiments of the present invention are not to be so limited. For example, in other embodiments, an application specific integrated circuit (ASIC) can be used. The FPGA 70 and the DSL chipsets 50 and 51 are controlled by a central processing unit 60, which is responsible for configuration, status and error handling of the DSL unit 14. The FPGA 70 is the functional block responsible for handling timeslot allocation, ordering subsets of timeslots, and switching of timeslots between interface formats of the plurality of ports 22. A time switch 72 controls the time slot allocation as directed by the central processing unit 60.

In addition, an HDLC encoder/decoder 15 is provided between the Ethernet port 24 and the FPGA 70 to HDLC encode/decode an Ethernet signal. When an Ethernet frame is input at the Ethernet port 24, the frame is passed to HDLC encoder/decoder 15 where the sync byte and start of frame byte of the Ethernet frame are removed to form a stripped Ethernet port. The HDLC encoder/decoder 15 also appends a two byte CRC to the stripped Ethernet frame. HDLC flags with the pattern "01111110" are also inserted at the beginning and end of the frame.

FIG. 5 shows one embodiment of the data structure 110 of the HDLC encoding. The data structure 110 includes the flag 120 which is one binary byte 01111110. The CRC 125 is 16 bits long and is created using the polynomial $X16+X12+X5+1$. The Ethernet frame 130 and the cyclic redundancy check 125 are bitwise checked. If a contiguous sequence of five ones (11111) are found, a zero is inserted so that no pattern between the start of the Ethernet frame 130 and the end of cyclic redundancy check 125 can resemble a flag (01111110). This prevents erroneous detection of flags within the Ethernet frame 130 or cyclic redundancy check 125. The HDLC flags are used to identify the start and end of a frame. The HDLC encoder/decoder 15 then inserts the encoded frame into a time division multiplex (TDM) byte stream and passes the TDM stream to FPGA 70.

Likewise, when a frame is prepared for egress from the DSL unit 14 via the Ethernet port 24, FPGA 70 extracts the corresponding timeslots from a PCM stream received from chipsets 50 and 51 and passes the timeslots to HDLC encoder/decoder 15 in a TDM byte stream. The TDM byte stream is examined in the HDLC encoder/decoder 15 for HDLC frames by searching for HDLC flags. When a frame is detected, HDLC encoder/decoder 15 removes the HDLC flags from the start and end of the frame. Similarly, the inserted "0" in the sequence "111110" is removed as well as the appended two byte CRC in HDLC encoder/decoder 15. Before removal, the CRC is used for error detection. HDLC encoder/decoder 15 then prepends the start of frame and sync bytes to the frame and passes the Ethernet frame to Ethernet port 24 where the frame is transmitted.

Once FPGA 70 orders and allocates timeslots to the signals from application ports 22 as described above, the timeslots are passed to DSL chipsets 50 and 51 via respective PCM interfaces 53. Notably, two PCM interfaces 53 are described herein for operating in 2-pair mode. However, it is to be understood that when operating in single pair mode only one PCM interface is used. The timeslots are modulated and transmitted via DSL chipsets 50 and 51 over DSL pairs to another DSL unit similar to DSL unit 14. In the reverse direction, the other DSL unit transports timeslots to DSL unit 14 via DSL chipsets 50 and 51 and DSL pair 44. FPGA 70 receives the timeslots via PCM interfaces 53 and switches the timeslots to the appropriate application ports 22. In particular, FPGA 70 switches the timeslots based on the order of the formats and the configured hybrid connections as described above. For example, in one embodiment, the PCM stream contains bytes from a G.703 interface in the first subset of timeslots and bytes from an Ethernet interface in subsequent timeslots. FPGA 70 switches the bytes from the G.703 interface to the G.703 port 28 and the bytes from the Ethernet interface to the Nx64k port 26.

In addition, FPGA 70 is configured, in some embodiments, to terminate timeslot 0 when receiving a structured G.703 signal from G.703 port 28 and to regenerate timeslot 0 when switching timeslots to G.703 port 28. When receiving an unstructured G.703 signal from G.703 port 28, FPGA 70 begins counting bytes from the beginning of the unstructured G.703 signal. For each byte FPGA 70 allocates a timeslot. In the reverse direction, FPGA sends the bytes as a continuous stream to G.703 port 28.

A user selects a mode of operation for the DSL unit 14 and configures a hybrid connection with another DSL unit via a user interface 42. In one implementation of this embodiment, the user also selects a data rate for transceived signals from a menu 66 via user interface 42. The time switch 72 is initialized by the central processing unit 60 based on the interface formats selected for the hybrid connection so that a selected data rate is accommodated by the DSL unit 14. A selection of data rate is provided by a user via the user interface 42.

The central processing unit 60 is communicatively coupled to a memory 64, which stores the menu 66 that includes the options for the data rate selection and the hybrid connection configuration. The central processing unit 60 is communicatively coupled to a storage medium 62. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

The central processing unit 60 executes software 88 and/or firmware that causes the central processing unit 60 to perform at least some of the processing described herein. At least a portion of such software 88 and/or firmware executed by the central processing unit 60 and any related data structures are stored in storage medium 62 during execution. Memory 64 comprises any suitable memory now known or later developed such as, for example, random access memory (RAM), read only memory (ROM), and/or registers within the central processing unit 60. In one implementation, the central processing unit 60 comprises a microprocessor or microcontroller. Moreover, although the central processing unit 60 and memory 64 are shown as separate elements in FIG. 3A, in one implementation, the central processing unit 60 and memory 64 are implemented in a single device (for example, a single integrated-circuit device). The software 88 and/or firmware executed by the central processing unit 60 comprises a plurality of program instructions that are stored or otherwise embodied on a storage medium 62 from which at least a portion of such program instructions are read for execution by the central processing unit 60. In one implementation, the central processing unit 60 comprises processor support chips and/or system support chips such as ASICs.

FIG. 6 is a flow chart depicting a method 600 of communicating in a network according to one embodiment of the present invention. Method 600 is used in a system such as system 100 above. At 602, a signal of a first interface format (for example, G.703, Nx64k, or Ethernet) is received at a first DSL unit via a corresponding application port (for example, application ports 22). At 604, a signal of a second interface format is received at the first DSL unit via a corresponding application port. At 606, the first DSL unit extracts timeslots from the first and second interface format signals. The number of timeslots extracted depends on the user selected data rate. In addition, with regards to a structured G.703 frame, in some embodiments, timeslot 16 is disabled and used for payload. Furthermore, extracting the correct number of timeslots from a structured G.703 frame includes terminating timeslot 0 in some embodiments. Extracting timeslots from an Ethernet signal involves various processes. An exemplary method of extracting timeslots from an Ethernet signal is shown in FIG. 7.

At 608, the first DSL unit inserts the extracted timeslots into a DSL frame and transmits the DSL frame to a second DSL unit. In particular, the first DSL unit inserts the extracted timeslots corresponding to the desired simple connection first (i.e., a first subset of timeslots) and then inserts the extracted timeslots corresponding to the desired cross-link connection (i.e., a second subset of timeslots). In this embodiment, the first DSL unit transmits the DSL frame according to the G.SHDSL standard. At 610, the second DSL unit extracts the first and second subsets of timeslots from the DSL frame. At 612, the second DSL unit passes the first subset of timeslots to an application port of the same interface format as the original timeslots. At 614, the second DSL unit then uses the second subset of timeslots to generate a signal of a dissimilar interface format as described above. In particular, the timeslots are switched to an application port of a dissimilar interface format. For example, an exemplary method for generating an Ethernet signal from the received second subset of timeslots in the DSL frame is shown in FIG. 8.

FIG. 7 is a flow chart depicting a method 700 of extracting timeslots from an Ethernet signal in a DSL unit according to one embodiment of the present invention. At 702, the sync bytes and the start of frame byte are removed from the Ethernet frame to form a stripped-Ethernet frame at 702. At 704, the stripped-Ethernet frame is HDLC encoded. HDLC encoding involves appending a two byte cyclic redundancy check (CRC) to the stripped Ethernet frame using the polynomial X16+X12+X5+1. The Ethernet frame plus CRC is then examined for a continuous bit sequence of five 1's (that is, 11111). A zero is inserted at the end of each sequence of five 1's (that is, 111110). HDLC flags with the pattern "01111110" are also inserted at the beginning and end of the frame. Zero insertion after a sequence of five 1s in the payload is used to avoid confusion of payload with HDLC flags. At 706, the HDLC encoded Ethernet frame is inserted into a TDM byte stream. At 708, the timeslots are extracted from the TDM byte stream.

FIG. 8 is a flow chart depicting a method 800 of generating an Ethernet signal from received timeslots in a DSL unit according to one embodiment of the present invention. At 802, the received timeslots are placed in a TDM byte stream. At 804, an HDLC frame is extracted from the TDM byte stream and decoded to retrieve a stripped Ethernet frame. In particular, HDLC frames are located using HDLC flags. Decoding the HDLC frame involves removing the HDLC flags from the start and end of the frame. Similarly, a zero inserted in the sequence "111110" is removed as well as a two byte CRC to form a stripped Ethernet frame. Before removal, the CRC is used for error detection at 806. If the frame fails the CRC check, the frame is discarded at 808. If the frame passes the CRC check, the stripped Ethernet frame, with the CRC removed, is then prepended with start of frame and sync bytes to form an Ethernet signal at 810.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication system comprising:
a first communication unit having a plurality of application ports; and
a second communication unit having a plurality of application ports and coupled to the first communication unit;
wherein the first communication unit is configured to extract timeslots from a first signal having a first interface format and from a second signal having a second interface format, and to insert the extracted timeslots into a frame for transmission to the second communication unit, the first communication unit further configured to insert the extracted timeslots of the first and second signals into the frame in a specific order;
wherein the second communication unit is configured to pass the first interface format signal to an application port of a similar interface format and to pass the second interface format signal to an application port of a third dissimilar interface format based on the specific order of the extracted timeslots in the frame transmitted from the first communication unit.

2. The communication system of claim 1, wherein each of the first and second communication units have three application ports.

3. The communication system of claim 1, wherein each of the first and second communication units is configured according to the G.SHDSL standard.

4. The communication system of claim 1, wherein the first communication unit is configured to place the extracted timeslots from the first interface format signal first in the frame, wherein the second communication unit is configured to pass the first extracted timeslots in the frame to an application port of a similar interface format.

5. The communication system of claim 1, wherein each of the first and second communication units has two Digital Subscriber Line (DSL) ports operating in M-pair mode.

6. The communication system of claim 1, wherein the second communication unit is configured to pass the second interface format signal to an application port of the third interface format by using one of timeslot range mapping and fractional timeslot mapping to generate a signal of the third interface format.

7. The communication system of claim 1, wherein the interface format for each of the plurality of application ports includes one of an Ethernet format, a G.703format, and an Nx64k format.

8. The communication system of claim 7, wherein the first and second DSL units are configured to remove timeslot 0 of a signal received from a G.703 interface format application port, and generate timeslot 0 prior to passing a signal to the G.703 interface format application port.

9. The communication system of claim 7, wherein the first and second DSL units each further comprise an HDLC encoder/decoder configured to HDLC encode an Ethernet signal before timeslots are extracted from the Ethernet signal.

10. A communication unit, comprising:
a plurality of application ports each of a different interface format; and
at least one communication line port, wherein the communication unit is configured to extract timeslots from a first signal of a first interface format received over one of the plurality of application ports and from a second signal of a second interface format received over another of the plurality of application ports, and to insert the extracted timeslots into a frame for transmission to a second communication unit over a digital subscriber line (DSL) connection;
wherein the communication unit is further configured to insert the extracted timeslots of the first and second signals into the frame in a specific order such that the second communication unit maps the extracted timeslots of the first signal to an application port of a similar interface format and maps the extracted timeslots of the second signal to an application port of a dissimilar interface format based on the insertion order of the extracted timeslots in the frame;
wherein the second interface format is an Ethernet format and the communication unit is configured to remove start of frame and synch bytes from the second signal and to insert HDLC flags in the second signal to identify the start and end of a frame, the communication unit further configured to transmit the HDLC encoded second signal to the second communication unit over the DSL connection.

11. The communication unit of claim 10, wherein the plurality of application ports comprises three application ports.

12. The communication unit of claim 10, wherein the communication unit is a Global.standard high-bit-rate digital subscriber line (G.SHDSL) unit.

13. The communication unit of claim 10, wherein the communication unit is configured to insert the timeslots of the first signal into the frame first to indicate that the timeslots of the first signal are to be mapped to an application port of a similar interface format.

14. The communication unit of claim 10, wherein the communication unit is configured to receive a frame containing timeslots from a first interface format signal and a third interface format signal, to pass the timeslots from the first interface format signal to an application port of a similar interface format, and to pass the timeslots from the third interface format signal to an application port of the second interface format based on the insertion order of the timeslots in the received frame.

15. The communication unit of claim 10, wherein the interface format for each of the plurality of application ports includes one of an Ethernet format, a G.703 format, and an Nx64k format.

16. The communication unit of claim 15, wherein the communication unit is configured to remove timeslot 0 of a signal received from a G.703 interface format application port, and generate timeslot 0 prior to passing a signal to the G.703 interface format application port.

17. The communication unit of claim 10 further comprising:
   two digital subscriber line (DSL) chipsets in a cascaded configuration operating in an M-pair mode.

18. A method of communicating in a network, the method comprising:
   receiving a first signal at a first communication unit over an application port using a first interface format;
   receiving a second signal at the first communication unit over an application port using a second interface format;
   receiving a third signal at the first communication unit over an application port using a third interface format;
   extracting timeslots from the first signal, the second signal, and the third signal;
   inserting the extracted timeslots from the first, second and third signals into a frame in a specific order;
   transmitting the frame to a second communication unit;
   extracting the timeslots from the frame in the second communication unit;
   based on the specific order of the timeslots in the frame, passing the timeslots from the first signal to an application port of the first interface format to form a simple connection; and
   based on the specific order of the timeslots in the frame, passing the timeslots from the second and third signals to a single application port of a dissimilar interface format to form a cross-link connection.

19. The method of claim 18, wherein receiving a first signal over an application port using a first interface format comprises receiving a signal of one of a G.703 format, an Nx64k format, and an Ethernet format.

20. The method of claim 18, wherein inserting the extracted timeslots into the frame in a specific order comprises inserting first the timeslots corresponding to the first signal and inserting second the timeslots corresponding to the second signal and the third signal.

* * * * *